United States Patent Office 3,778,427
Patented Dec. 11, 1973

3,778,427
HEXAPEPTIDE
George Rogelio Flouret, Waukegan, Ill., assignor to Abbott Laboratories, North Chicago, Ill.
No Drawing. Filed Nov. 2, 1971, Ser. No. 199,394
Int. Cl. C07c 103/52
U.S. Cl. 260—112.5                                                  4 Claims

ABSTRACT OF THE DISCLOSURE

The synthesis of the hexapeptide Tyr-Gly-Leu-Arg-Pro-Gly-amide carrying easily removable protective groups on the Tyr and Arg moieties is described; the correspondingly protected pentapeptide is used as the starting material. The hexapeptide, upon removal of any protective group on the nitrogen of the tyrosine moiety, is an important intermediate for the preparation of the gonadotropin-releasing hormone.

DETAILED DESCRIPTION OF THE INVENTION

Recent discovery of the aminoacid sequence of the gonadotropin (Gn)-releasing hormone (RH) has made it highly desirable to produce this substance on a practical scale in a purity sufficient to use the substance therapeutically in instances of hormone deficiencies and possibly as a regulating agent for the ovulation cycle in female warm-blooded animals. For instance, it has been found that small doses of Gn-RH administered by intravenous injections to female sheep in the anestrus cycle produces ovulation. The formula of the Gn-RH has been identified with the aminoacid sequence pyroGlu-His-Trp-Ser-Tyr-Gly-Leu-Arg-Pro-Gly-NH$_2$ but in order to make such a large molecule from simple, single aminoacids, a considerable number of steps including several condensation reactions are required. In order to assure such condensations to take place at the desired sites, other active sites or functional groups on the molecule might be conveniently protected by some groups that can be removed at will.

A relatively simple method has now been devised to produce the desired aminoacid chain in surprisingly good yields. The new method involves a minimum of group-protecting and -removal reactions for such protective groups and employs a number of new intermediates which are important stepping stones for making Gn-RH and other peptides.

For the purpose of the present disclosure, it is to be understood that all aminoacids used herein are in their optically active L-form except for glycine.

The present invention is particularly concerned with the hexapeptide which is one of the precursors for making Gn-RH and carried protective groups on the active sites of the tyrosine and arginine moieties that can be removed by simple methods, if desired, to make the unprotected hexapeptide or, if desired, after further peptide chain extension. It is another object of the present invention to provide a process for the preparation of a protected hexapeptide that may be used for chain extension to the correspondingly protected decapeptide which is a direct precursor to Gn-RH. It is a further object of this invention to provide a poly-protected hexapeptide that can be used without adding further protective groups as an intermediate to make the correspondingly protected Gn-RH.

These and other objects are accomplished by providing

Y-(O-R')Tyr-Gly-Leu-(N$^\alpha$-R'')Arg-Pro-Gly-NH$_2$   (I)

wherein R' and R'' are protective groups that are removable by hydrogenation or treatment with hydrogen fluoride and Y is hydrogen or a protective group that can be removed from the intact peptide chain without affecting R' and R''. Ordinarily, R' is represented by tetrahydropyranyl, tert.-butyl, acetyl, BOC, benzyloxycarbonyl, benzyl, triphenylmethyl or tosyl and R'' is nitro, tosyl, BOC, p - nitrobenzyloxycarbonyl or tetrachloroisopropyloxyphthalyl which is used to substitute one of the hydrogen atoms in the amino group of the guanidine moiety in Arg; Y is hydrogen, tert.-butyloxycarbonyl (BOC), o-nitrophenylsulfenyl, 2 - (p - diphenyl)-isopropyloxycarbonyl, benzyloxycarbonyl or phthalyl.

The protected hexapeptide of Formula I is prepared by reacting the N$^\alpha$-protected pentapeptide Gly-Leu-(N$^\omega$R'') Arg-Pro-Gly-NH$_2$ with Y-(O-R')Try p-nitrophenyl ester (NPE) in an inert solvent; Y-(O-R')Tyr is

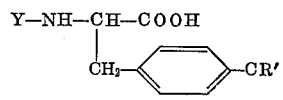

wherein Y is tert.-butyloxycarbonyl, benzyloxycarbonyl, p-nitro- or p-methyloxybenzyloxycarbonyl, 2-(p-diphenyl)-isopropyloxycarbonyl, o-nitrophenylsulfenyl, phthalyl or trifluoracetyl and R' is selected from the above identified easily removable conventional methods to produce the hexapeptide carrying only protective groups R' and R''. This di-protected hexapeptide (Formula I; Y is hydrogen) can be converted to the similarly protected decapeptide by reacting it first with BOC-O-benzylserine NPE, removing the BOC group, condensing the resulting heptapeptide with BOC-tryptophane NPE, removing the BOC group, subsequently condensing the obtained octapeptide with N$^{\text{Im}}$-protected (or unprotected) histidine carrying a N$^\alpha$-protective group and after removing the latter, the formed triprotected nonapeptide is reacted with pyroglutamic acid pentachlorophenyl ester. The free decapeptide (or Gn-RH) can be obtained from the condensation product by treating it with hydrogen fluoride. During this reaction, the protective groups R' and R'' and the benzyl group at the serine moeity all are removed and replaced by hydrogen. Alternately, some commonly used protective groups can be removed by hydrogenation using a palladium catalyst.

In a more specific embodiment, the above-named protected pentapeptide wherein R'' is NO$_2$ dissolved in dimethylformamide at a concentration of between 0.1 and 1.0 molarity and condensed with a 0–50% excess over molarity of BOC-O-benzyl-tyrosine PNE or a similarly N- and O-protected ester of tyrosine at a temperature between 0 and 30° C. After several hours, the reaction solution is evaporated and the residue dissolved in 15% methanol/chloroform and the solution is placed on a silica gel column. The column is eluted with chloroform containing increasing amounts of methanol until the desired hexapeptide appears in the eluate. The desired fractions of eluate are then combined.

In order to prepare Gn-RH from the above material, the protective group Y is removed from the Tyr moiety by any of the suitable methods known in the peptide art and the resulting diprotected hexapeptide is condensed first with BOC-(O-Bzl)Ser-NPE and then in sequence with the other aminoacids with or without further protective groups. The resulting poly-protected decapeptide is then dissolved in an inert solvent and placed in a HF-resistant reaction vessel and treated there at a temperature between 0° and 30° C. with excess hydrogen fluoride. The excess hydrogen fluoride is removed after about one hour, the solvent is removed and the product is dried and purified. The Gn-RH prepared in this manner is highly active in biological tests showing luteinizing hormone-releasing activity in warm-blooded animals.

In order to make the pentapeptides used as the starting material for the present invention, the following reaction sequence is carried out: N-benzyloxycarbonyl-proline NPE is reacted with glycinamide, preferably with an excess of the latter over the equimolar amount, and the obtained N-benzyloxycarbonylprolylglycinamide is converted to the unprotected dipeptide by hydrogenation or acid treatment. The prolylglycinamide is then reacted with $N^\alpha$-benzyloxycarbonyl-$N^\omega$-nitro-arginine to form a twice protected tripeptide from which the benzyloxycarbonyl group is removed by acid treatment to furnish $N^\omega$-nitroarginylprolylglycinamide, hereinafter referred to as ($N^\omega$-$NO_2$)Arg-Pro-Gly-$NH_2$. The latter is reacted with N-BOC-leucine NPE to produce a twice-protected tetrapeptide from which the BOC group is removed by treatment with an acid to yield Leu-($N^\omega$-$NO_2$)Arg-Pro-Gly-$NH_2$. This $NO_2$-protected tetrapeptide is reacted with BOC-glycine NPE to a twice-protected pentapeptide from which the BOC group is removed as in the case of the tetrapeptide to produce Gly-Leu-($N^\omega$-$NO_2$)Arg-Pro-Gly-$NH_2$.

The above mentioned condensation reactions are all carried out in the presence of an inert solvent such as dimethylacetamide or dimethylformamide or other organic liquids that do not react with either of the starting materials or the product of each step. Of course, it is to be understood that the above reaction sequence may be followed without using the specific protective group named in the described stages. For instance, the nitro group protecting the amino group in the guanidine moiety of arginine may be replaced by converting the amino group to an amide or half-amide with a sulfonic or a carboxylic acid, e.g., tosyl, benzyloxycarbonyl or tetrachloroisopropyloxyphthalyl. In all instances, the protective groups employed in making up the aminoacid sequence of Gn-RH, of course, should be chosen in such a way that they can easily be removed by one or more simple treatments which are mild enough as not to affect the peptide chain bonds. This is the case with all above mentioned protective groups and also includes the p-nitro-, p-methyl and p-methoxy substituted derivatives of the above listed groups containing a benzyl moiety.

If desired, the protective groups may be removed stepwise; for instance, where R' is the usual benzyl or substituted benzyl group, it may be removed by hydrogenation and subsequently, the protective group on the arginyl fragment can be removed by a suitable reaction step that does not affect the peptide links. Of course, such a reaction sequence may be reversed, if desired. However, in removing R' first, the ensuing hexapeptide carrying only a protection in the Arg moiety is of considerable value since it permits a new choice of protection for the hydroxy group in tyrosine that may be more advantageous in later steps leading to Gn-RH.

In order to show the preparation of the new heptapeptide, reference is made to the following examples which are to be understood as illustrations only and are not to be construed to limit the invention in any respect.

EXAMPLE 1

A solution of 5.09 g. of Gly-Leu-($N^\omega$-$NO_2$)Arg-Pro-Gly-$NH_2$ in 10 ml. of dimethylformamide is treated with 5.56 g. (20% excess) of BOC-(O-benzyl)-tyrosine PNE. The resulting solution is worked up after 16 hours of standing at room temperature by evaporating the dimethylformamide in vacuo and placing the residual oil representing crude, tri-protected hexapeptide in 5% methanol in chloroform on 150 g. of silica gel. The column is first eluted with 5% methanol in chloroform and then the desired compound is eluted with 15% methanol in chloroform. Evaporation of the methanol/chloroform solution afforded 7.81 g. (93% of theory) of pure N-BOC-(O-Bzl)Tyr-Gly-Leu-($N^\omega$-$NO_2$)Arg-Pro-Gly-$NH_2$ which has an undefined melting point. The NMR spectrum is consistent with the structure and the elemental analysis is correct. The $R_f$ in 15% methanol in chloroform is 0.3 and $[\alpha]_D^{24}$ —26.6 (c. 1; dimethylformamide).

EXAMPLE 2

A solution of 896 mg. of BOC-(O-Bzl)Tyr-Gly-Leu-($N^\omega$-$NO_2$)Arg-Pro-Gly-$NH_2$ in 20 ml. of trifluoroacetic acid/methylene chloride 1:1 is allowed to stand for 15 minutes at room temperature. The solution is evaporated, methylene chloride is added again and this step is repeated 5 times. The resulting dry material is dissolved in methanol and treated with an ion exchange resin (in the OH-cycle). The suspension is filtered and the resin is washed with methanol/acetic acid 9:1. The combined filtrate and wash liquor is evaporated to a dry powder which had an undefined melting point. The NMR spectrum and the elemental analysis confirm the expected aminoacid sequence: (O-Bzl)Tyr - Gly - Leu-($N^\omega$-$NO_2$)Arg-Pro-Gly-$NH_2$ and the compound shows $R_f$ 0.1 in 15% methanol in chloroform (single spot). The yield was above 95% of theory.

To further characterize this material, the above compound was condensed with BOC-(O-Bzl)serine NPE in a procedure similar to that described in Example 1 and the BOC-group was removed as described above. Further condensation with BOC-tryptophane NPE and removal of the BOC-group produced the tri-protected octapeptide. This reaction sequence was then repeated with BOC-histidine. The formed nonapeptide carrying protective groups R, R' and R'' was then condensed with pyroglutamic acid pentachlorophenyl ester in dimethylformamide to the corresponding decapeptide. The condensation product was isolated from the reaction solution by evaporation, dissolution in methanol/chloroform and purification by chromatography, using chloroform with increasing amounts of methanol as the eluate. The obtained decapeptide (Formula I wherein R'=benzyl, R''=$NO_2$, Y=pyroGlu-His-Trp-(O-Bzl)Ser was then treated with excess hydrogen fluoride using anisole as the scavenger. Work-up of the reaction mixture by known methods furnished the compound of Formula I wherein Y is pyroGlu-His-Trp-Ser and R' and R'' are hydrogen. This product was found to be identical with a sample of natural Gn-RH.

EXAMPLE 3

A solution of 896 mg. of the compound of Example 1 (triprotected hexapeptide) in 10 ml. of trifluoroacetic acid containing 1 ml. of anisole is saturated at 0° C. with dry, gaseous hydrogen bromide which was passed through a resorcinol-trifluoroacetic acid solution. After saturation, slow hydrogen bromide gas bubbling is continued for 1 hour. The solution is then evaporated to a dry film which is redissolved in trifluoroacetic acid and the solution is evaporated again. The residue is dissolved in 5 ml. of trifluoroacetic acid and added to 100 ml. of ether. The hexapeptide hydrobromide precipitates and the supernatant is decanted. The solid is washed four more times with 100 ml. portions of ether and decanting and the final solid is dried over phosphorous pentoxide/potassium hydroxide in vacuum. The dried material analyzes correctly for Tyr-Gly-Leu-($NO_2$)Arg-Pro-Gly-$NH_2 \cdot$HBr and its NMR spectrum is consistent with the assigned structure.

When the above procedure is carried out with the compound of Example 2 instead of the $N^\alpha$-protected product of Example 1, the same final compound is obtained. This compound, carrying only a protective group at the arginyl moiety, can be reprotected again at the hydroxy (and/or the amino) group of the tyrosyl moiety to yield a molecule suitable for further condensation with an amino acid to produce a heptapeptide.

By replacing the Gly-Leu-($N^\omega$-$NO_2$)Arg-Pro-Gly-$NH_2$ used above with other pentapeptides of the same sequence but carrying other protective groups, the following hexapeptides are prepared in the same manner:

Y-(O-Bzl)Tyr-Gly-Leu-(N$^\omega$-NO$_2$)Arg-Pro-Gly-NH$_2$
Y-(O-TRI)Tyr-Gly-Leu-(N$^\omega$-NO$_2$)Arg-Pro-Gly-NH$_2$
Y-(O-Z)Tyr-Gly-Leu-(N$^\omega$-NO$_2$)Arg-Pro-Gly-NH$_2$
Y-(O-Ac)Tyr-Gly-Leu-(N$^\omega$-NO$_2$)Arg-Pro-Gly-NH$_2$
Y-(O-Tos)Tyr-Gly-Leu-(N$^\omega$-NO$_2$)Arg-Pro-Gly-NH$_2$
Y-(O-THP)Tyr-Gly-Leu-(N$^\omega$-NO$_2$)Arg-Pro-Gly-NH$_2$
Y-(O-tBu)Tyr-Gly-Leu-(N$^\omega$-NO$_2$)Arg-Pro-Gly-NH$_2$
Y-(O-MeOBzl)Tyr-Gly-Leu-(N$^\omega$-NO$_2$)Arg-Pro-Gly-NH$_2$ wherein Y is a suitable N$^\alpha$-blocking group for tyrosine that can be removed without affecting the aminoacid chain, Z stands for benzyloxycarbonyl, THP means tetrahydropyranyl, tBu is tert.-butyl, MeOBzl is p-methoxybenzyl, Tos is tosyl (p-toluenesulfonyl), Ac is acetyl and TRI is triphenylmethyl. Other blocking groups that may be used include the trifluoroacetyl and other known alkyl groups that can be cleaved without affecting the desired peptide sequence. In all instances, the N$^\omega$ of arginine may carry the tosyl group, benzyloxycarbonyl or similar protective groups in place of the above used nitro group. In each case, the reaction described above proceeds in the same fashion and all of the listed compounds may be converted to polyprotected Gn-RH by the series of condensation reactions and deprotecting steps described above. By proper selection of the protective groups on Ser, Tyr, Arg (and optionally on His), all of them may be removed simultaneously with hydrogen fluoride to yield Gn-RH making these hexapeptides all equally useful precursors therefor.

Of course, the synthesis for the protected pentapeptide starting materials described above has to be modified when making the hexapeptides carrying a different protective group on the N-arginyl moiety. However, using other protected arginine in the shown sequence does not alter the synthesis described in the present invention in a significant manner. The individual amino-acids carrying the above-shown protective groups including the O-protected tyrosine are known in the art and are often used in peptide syntheses; they are described in the English edition of the textbook by Schröder et al., entitled The Peptides I (Academic Press 1965) on pp. 167–174 for arginine and pp. 222–225 for tyrosine or in Peptides, Proceedings of the 9th European Peptide Symposium, edited by Beyerman (North-Holland Publishing Co., Amsterdam 1967), p. 50 ff for arginine.

I claim:

1. The hexapeptide Y - (O-R')Tyr-Leu-(N$^\omega$-R'')Arg-Pro-Gly-NH$_2$ wherein Y is hydrogen or tert.-butyloxycarbonyl and R' and R'' are hydrogen or protective groups which can be removed by one or more chemical treatments which do not affect the peptide chain.
2. The hexapeptide of claim 1 where Y is hydrogen.
3. The hexapeptide of claim 1 where Y is tert.-butyloxycarbonyl.
4. The hexapeptide of claim 1 wherein Y is tert.-butyloxycarbonyl or hydrogen, R' is benzyl and R'' is NO$_2$.

References Cited
UNITED STATES PATENTS
3,704,288  11/1972  Skorcz _____ 260—112.5

ELBERT L. ROBERTS, Primary Examiner

U.S. Cl. X.R.
424—177